US012598046B2

(12) United States Patent
Jampala et al.

(10) Patent No.: US 12,598,046 B2
(45) Date of Patent: Apr. 7, 2026

(54) MANAGING MULTIPLE CARRIERS OF RADIO DISCOVERED BY NGDU IN O-RAN

(71) Applicant: Rakuten Symphony, Inc., Tokyo (JP)

(72) Inventors: Naga Krishna Prasad Jampala,
Bangalore (IN); Sukesh Thotengara,
Bangalore (IN); Biswajit Panigrahi,
Bangalore (IN)

(73) Assignee: RAKUTEN SYMPHONY, INC.,
Tokyo (JP)

( * ) Notice: Subject to any disclaimer, the term of this
patent is extended or adjusted under 35
U.S.C. 154(b) by 339 days.

(21) Appl. No.: 18/022,694

(22) PCT Filed: Feb. 8, 2023

(86) PCT No.: PCT/US2023/062213

§ 371 (c)(1),
(2) Date: Feb. 22, 2023

(87) PCT Pub. No.: WO2024/144893

PCT Pub. Date: Jul. 4, 2024

(65) Prior Publication Data

US 2025/0358081 A1      Nov. 20, 2025

(30) Foreign Application Priority Data

Dec. 27, 2022      (IN) .............................. 202241075854

(51) Int. Cl.
H04L 5/00 (2006.01)
(52) U.S. Cl.
CPC .......... H04L 5/0094 (2013.01); H04L 5/0023
(2013.01)

(58) Field of Classification Search
CPC ............................ H04L 5/0094; H04L 5/0023
See application file for complete search history.

(56) References Cited

U.S. PATENT DOCUMENTS 11,516,721 B1 * 11/2022 Kuppuswamy ....... H04W 40/02
2020/0235788 A1 * 7/2020 Rajagopal ............ H04B 7/0456
(Continued)

OTHER PUBLICATIONS

ETSI TS 103 859 v7.0.2 O-RAN Fronthaul Control, User, and
Synchronization Plane Specification v07.02; (O-RAN-WG4.CUS.
0-v07.02). Sep. 2022. (Year: 2022).*
(Continued)

*Primary Examiner* — Stephen J Clawson
(74) *Attorney, Agent, or Firm* — Sughrue Mion, PLLC

(57) ABSTRACT

Embodiments are directed to a NGDU for managing radio
units in an O-RAN. The NGDU includes a RIM manage-
ment controller, a plurality of DUs, at least two processing
units includes multiple CPRI ports and a plurality of RUs
connected to each of the at least two processing units
through the plurality of CPRI ports. The RIM management
controller includes a memory and a processor. The processor
is configured to receive a DU port ID associated with the RU
and determine a processing unit to which the at least one RU
is connected based on the DU port ID. The processor is also
configured to map the processing unit to a CPRI port in a DU
port registry, determine the CPRI port connecting the RU to
the NGDU based on the mapping and enable communication
between the RU connected to the determined CPRI port and
a corresponding DU over the ORAN.

10 Claims, 4 Drawing Sheets

(56) References Cited

U.S. PATENT DOCUMENTS

| | | | | |
|---|---|---|---|---|
| 2020/0344715 | A1* | 10/2020 | Radian .................. | H04W 8/005 |
| 2021/0211166 | A1* | 7/2021 | Qiang .................. | H04B 7/0456 |
| 2021/0243839 | A1* | 8/2021 | Krishnaswamy ..... | H04W 24/04 |
| 2022/0014326 | A1* | 1/2022 | Lourdu Raja ......... | H04L 5/0048 |
| 2022/0150059 | A1* | 5/2022 | Tanaka .................. | H04L 9/0855 |
| 2022/0182172 | A1* | 6/2022 | Nath ..................... | H04L 5/0053 |
| 2022/0286910 | A1* | 9/2022 | Ramakrishnan ...... | H04W 48/08 |
| 2023/0108782 | A1* | 4/2023 | Kang .................. | H04W 88/085 |
| | | | | 370/336 |
| 2023/0125913 | A1* | 4/2023 | Jeon ..................... | H04W 24/04 |
| | | | | 370/217 |
| 2023/0292175 | A1* | 9/2023 | Kong .................... | H04W 28/06 |
| 2024/0223461 | A1* | 7/2024 | Mukherjee ............ | H04W 24/06 |
| 2024/0223462 | A1* | 7/2024 | Pendyala .............. | H04L 41/145 |
| 2024/0224071 | A1* | 7/2024 | Jampala ................. | H04L 69/08 |
| 2025/0039702 | A1* | 1/2025 | Baker ................... | H04W 24/04 |
| 2025/0062967 | A1* | 2/2025 | Yao ........................ | H04L 41/40 |

OTHER PUBLICATIONS

Umesh, Anil, et. al. "Overview of O-RAN Fronthaul Specifications" NTT Docomo Technical Journal, 2019. (Year: 2019).*
International Search Report dated Jun. 28, 2023 issued by the International Searching Authority in application No. PCT/US 23/62213.
Written Opinion dated Jun. 28, 2023 issued by the International Searching Authority in application No. PCT/US 23/62213.

* cited by examiner

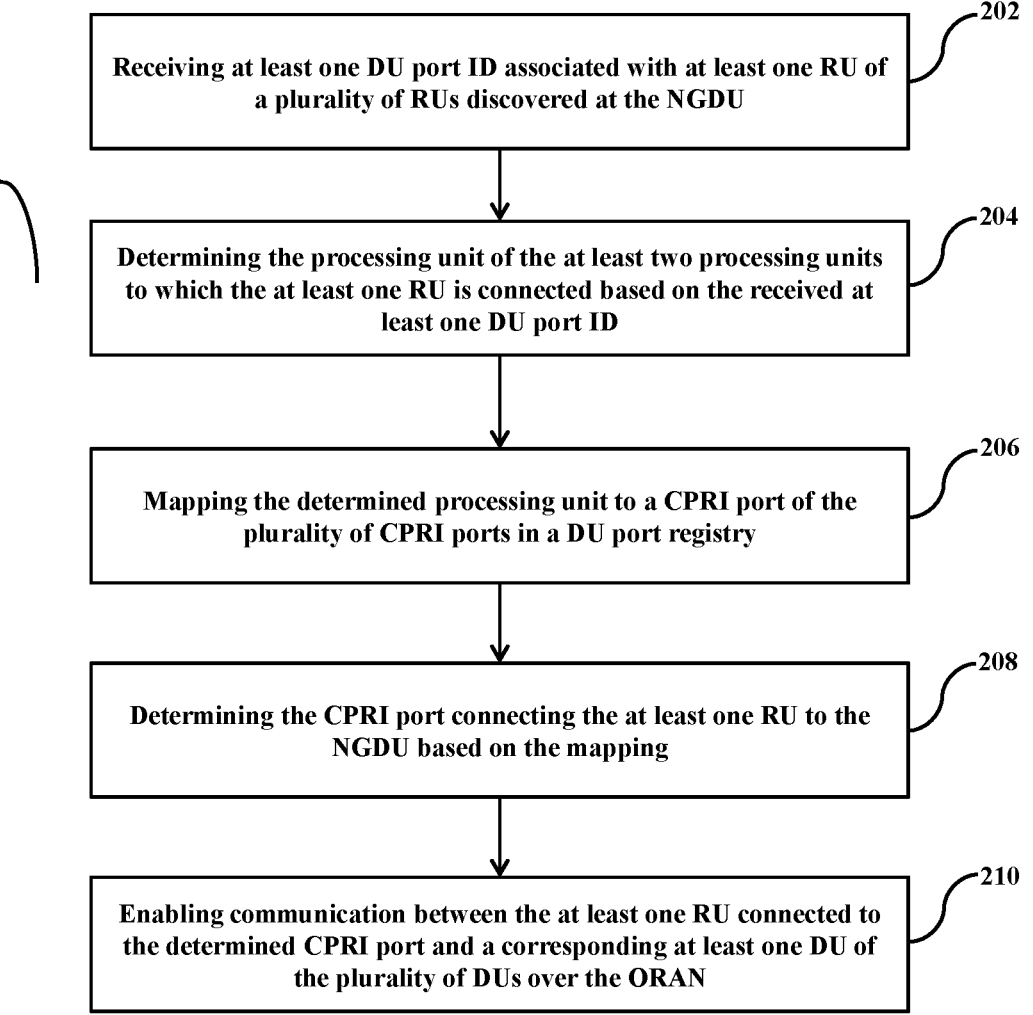

200

202

Receiving at least one DU port ID associated with at least one RU of a plurality of RUs discovered at the NGDU

204

Determining the processing unit of the at least two processing units to which the at least one RU is connected based on the received at least one DU port ID

206

Mapping the determined processing unit to a CPRI port of the plurality of CPRI ports in a DU port registry

208

Determining the CPRI port connecting the at least one RU to the NGDU based on the mapping

210

Enabling communication between the at least one RU connected to the determined CPRI port and a corresponding at least one DU of the plurality of DUs over the ORAN

FIG. 2

| ORAN Specification v3.0 | DU ID | | Band Sector ID | | CC ID | | RU ID | | | | | | | | | |
|---|---|---|---|---|---|---|---|---|---|---|---|---|---|---|---|---|
| Proposed Definition | DU ID | | Sector ID | | Band ID | | | | | | | | | | | RU ID |
| | 15 | 14 | 13 | 12 | 11 | 10 | 9 | 8 | 7 | 6 | 5 | 4 | 3 | 2 | 1 | 0 |
| | DU_Port_ID (2-bits) | | Sector ID (3-bits) | | | Band ID (1-bit) | Carriers (2-bits) | | PRACH (01) SRS NPUSCH (10) NPRACH (11) | | Layers (2 to 4 bits) Antennas (6-bits) Polarity (1-bit) | | | | | |
| NG-DU | CPRI RRH (2 bits) | | DU port ID (3 bits) | | | | | | | | | | | | AxC per CPRI (2 bits) | |
| Example Values | | | | | | | | | | | | | | | | |
| PDSCH | 00000 to 11111 | | | | | | x | x | 0 | 0 | x | x | 0000 to 1111 | | | |
| PUSCH | 00000 to 11111 | | | | | | x | x | 0 | 0 | x | x | x | 000 to 111 | | |
| PRACH (Non-beamforming) | 00000 to 11111 | | | | | | x | x | 0 | 1 | x | x | x | 000 to 111 | | |
| PRACH (Beamforming – upto 4 bands) | 00000 to 11111 | | | | | 01 | 00 to 11 | | 0 | 1 | x | x | x | x | 01* | |
| SRS (Antennas) | | | | | | | | | 1 | 0 | 000000 to 111111 | | | | | |
| NB-IoT | | | | | | | | | 1 | 1 | TBD | | | | | |

FIG. 4

MANAGING MULTIPLE CARRIERS OF RADIO DISCOVERED BY NGDU IN O-RAN

CROSS REFERENCE TO RELATED APPLICATIONS

The present application claims priority to Indian Patent Application No. 202241075854 entitled "Managing multiple carriers of radio discovered by NGDU in O-RAN" filed Dec. 27, 2022, which is hereby incorporated by reference in its entirety.

FIELD OF INVENTION

The present disclosure relates to wireless communication and Open Radio Access Network (O-RAN), and more specifically related to a method and a Next Generation Distributed Unit (NGDU) for managing radio units in an O-RAN.

BACKGROUND

In general, Open-radio access network (O-RAN) standard-based packet networking fronthaul interfaces between a distributed unit (DU) and a radio unit (RU) for 4G and new radio (NR) 5G radio access technologies (RAT) are widely being deployed. The main cause for the growth in the deployment of the Open-RAN is because the O-RAN standard provides interoperability and standardization of RAN components, primarily the DU and the RU by including a unified interconnection standard over packet-based transport interfaces like Common Public Radio Interface (CPRI) and Radio over Ethernet (RoE). As a result, seamless integration of hardware and open-source software elements from different vendors for DUs and RUs are provided.

The RU that supports both long-term evolution (LTE) carrier and NR carrier will be shared between $5^{th}$ generation distributed unit (5G DU) and 4G LTE DU. Next generation distributed unit (NGDU) is an entity that interconnects the RU which operates on CPRI IO MPLANE front haul interface with the DUs that operates on the O-RAN front haul interface. Both the LTE DUs and the NR DUs support the O-RAN enabled front haul interface.

In conventional methods and systems, if a radio is connected to two CPRI ports and communicates with multiple DUs, then with current specification the DU is not able to determine which radio is connected to which CPRI port if the DU is managing multiple sectors. Also, excid is tightly coupled with FPGA number as well as CPRI port. On discovery of the RU respective excid (DU port id) has to configured from DU through M-plane of the O-RAN. Through the M-plane, there is no yang leaf to specify the CPRI port which got discovered. If the DU port id does not match with the discovered CPRI port, then data packets get dropped leading to loss of data. Thus, it is desired to manage the discovered radios such that it is devoid of the above issues.

OBJECT OF INVENTION

The principal object of the embodiments herein is to provide a method and an Next Generation Distributed Unit (NGDU) for managing radio units in an Open Radio Access Network (O-RAN). The proposed method enables multiple radios to be connected to multiple CPRI ports in the NGDU and also to identify a specific radio which is connected to a specific CPRI port. Therefore, the proposed method provides flexibility of connecting the radios to multiple DUs of the NGDU.

SUMMARY

Accordingly, embodiments herein disclose a Next Generation Distributed Unit (NGDU) for managing radio units in an Open Radio Access Network (O-RAN). The NGDU includes a radio interface module (RIM) management controller comprising a M-plane model, a plurality of DUs connected to the RIM management controller, at least two processing units connected to the RIM management controller and a plurality of RUs connected to each of the at least two processing units through the plurality of CPRI ports. Each of the at least two processing units comprises a plurality of Common Public Radio Interface (CPRI) ports. The RIM management controller includes a memory and a processor.

The processor is configured to receive at least one DU port ID associated with the at least one RU of the plurality of RUs discovered at the NGDU and determine a processing unit of the at least two processing units to which the at least one RU is connected based on the received at least one DU port ID. Further, the processor is configured to map the determined processing unit to a CPRI port of the plurality of CPRI ports in a DU port registry, determine the CPRI port connecting the at least one RU to the NGDU based on the mapping, and enable communication between the at least one RU connected to the determined CPRI port and a corresponding at least one DU of the plurality of DUs over the ORAN.

In an embodiment, the DU port registry comprises a list of DU port ID supported by each of the at least two processing units with corresponding CPRI of the at least two processing units.

In an embodiment, the at least one DU port ID associated with the at least one RU is received in at least one of an extended Antenna-Carrier (eAxC) identifier and a RTC PCID.

In an embodiment, the processor is configured to enable the communication between the at least one RU and the corresponding at least one DU of the plurality of DUs based on the determined the CPRI port includes determine an identity of the at least one RU of the plurality of RUs connected to the determined CPRI port. The processor is also configured to send the identity of the at least one RU connected to the determined CPRI port to the corresponding at least one DU enable control plane (C-Plane) data communication between the at least one RU and the at least one corresponding DU. The corresponding at least one DU is determined based on the mapping performed in the DU port registry.

In an embodiment, the processing unit is a field programmable gate array (FPGA) comprising the plurality of CPRI ports.

Accordingly, embodiments herein disclose a method for managing radio units in an Open Radio Access Network (O-RAN) by a Next Generation Distributed Unit (NGDU). The method includes receiving, by the NGDU, at least one DU port ID associated with at least one RU of a plurality of RUs discovered at the NGDU and determining, by the NGDU, a processing unit of the at least two processing units to which the at least one RU is connected based on the received at least one DU port ID. The plurality of RUs is connected to at least two processing units through a plurality of Common Public Radio Interface (CPRI) ports. The method also includes mapping, by the NGDU, the determined processing unit to a CPRI port of the plurality of CPRI ports in a DU port registry, determining, by the NGDU, the CPRI port connecting the at least one RU to the NGDU based on the mapping; and enabling, by the NGDU, communication between the at least one RU connected to the determined CPRI port and a corresponding at least one DU of the plurality of DUs over the ORAN.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 2 is a flow diagram illustrating a method for managing the radio units in the O-RAN, according to an embodiment as disclosed herein;

FIG. 4 is an example illustrating RTC PCID comprising DU port ID for identifying a FPGA, according to an embodiment as disclosed herein.

DETAILED DESCRIPTION OF INVENTION

Figure 1:
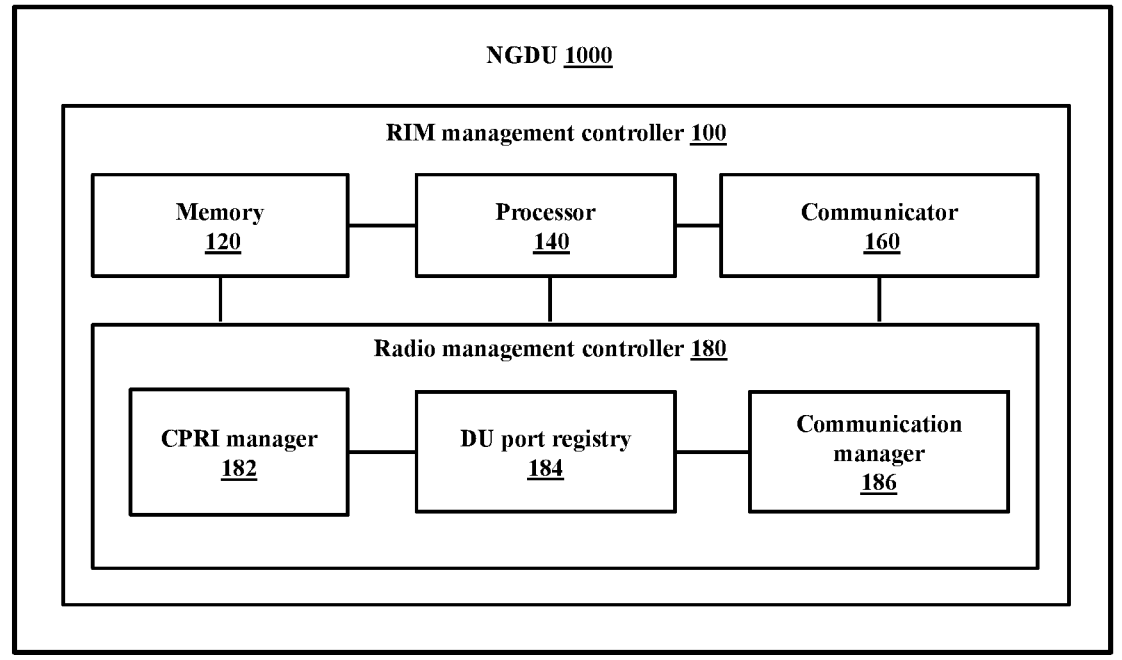
FIG. 1 illustrates a block diagram of a NGDU comprising a RIM management controller for managing radio units in an O-RAN, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a Next Generation Distributed Unit (NGDU) for managing radio units in an Open Radio Access Network (O-RAN). The NGDU includes a RIM management controller comprising a M-plane model, a plurality of DUs connected to the RIM management controller, at least two processing units connected to the RIM management controller and a plurality of RUs connected to each of the at least two processing units through the plurality of CPRI ports. Each of the at least two processing units comprises a plurality of Common Public Radio Interface (CPRI) ports. The RIM management controller includes a memory and a processor.

The processor is configured to receive at least one DU port ID associated with the at least one RU of the plurality of RUs discovered at the NGDU and determine a processing unit of the at least two processing units to which the at least one RU is connected based on the received at least one DU port ID. Further, the processor is configured to map the determined processing unit to a CPRI port of the plurality of CPRI ports in a DU port registry, determine the CPRI port connecting the at least one RU to the NGDU based on the mapping, and enable communication between the at least one RU connected to the determined CPRI port and a corresponding at least one DU of the plurality of DUs over the ORAN.

Accordingly, embodiments herein disclose a method for managing radio units in an Open Radio Access Network (O-RAN) by a Next Generation Distributed Unit (NGDU). The method includes receiving, by the NGDU, at least one DU port ID associated with at least one RU of a plurality of RUs discovered at the NGDU and determining, by the NGDU, a processing unit of the at least two processing units to which the at least one RU is connected based on the received at least one DU port ID. The plurality of RUs is connected to at least two processing units through a plurality of Common Public Radio Interface (CPRI) ports. The method also includes mapping, by the NGDU, the determined processing unit to a CPRI port of the plurality of CPRI ports in a DU port registry, determining, by the NGDU, the CPRI port connecting the at least one RU to the NGDU based on the mapping; and enabling, by the NGDU, communication between the at least one RU connected to the determined CPRI port and a corresponding at least one DU of the plurality of DUs over the ORAN.

Conventional methods and systems a CPRI port ID was part of the DU port ID. Therefore, extracting CPRI port information was done from eAxC ID. However, the DU was not able to determine the same.

Unlike to the conventional methods and systems, the proposed method includes determining the CPRI port to which the RU is connected using a registry based on the DU port ID. Once the DU port ID is determined, the same is used to run through the registry which includes details of the corresponding CPRI ports for the discovered DU port ID. Therefore, the proposed method simplifies the radio discovery process and also enables the legacy systems to use the CPRI interface and also have multiple carrier radios.

Unlike to the conventional methods and systems, the proposed method includes the NGDU supporting multiple radios which are connected to different CPRI ports.

Referring now to the drawings, and more particularly to FIGS. 1 through 4, where similar reference characters denote corresponding features consistently throughout the figures, there are shown preferred embodiments.

FIG. 1 illustrates a block diagram NGDU (1000) comprising a RIM management controller (100) for managing radio units in an O-RAN, according to an embodiment as disclosed herein.

O-RAN specifications permit interoperability of RAN components, for example but not limited to O-RAN specification compliant radios (or O-RAN radio units or O-RAN radios) and an O-RAN specification compliant distributed units (or O-RAN distributed units), made by different vendors. The O-RAN distributed unit may be executed on a server system, for example but not limited to local server network(s) and/or cloud computing system(s). The O-RAN distributed unit (O-DU) may comprise virtual baseband unit(s)). The O-RAN specifications utilize message protocols to communicate between remote radio units and virtual baseband units that differ from those used in legacy systems, for example but not limited to 4G specification compliant radio access networks (or 4G radio access networks). A virtual baseband unit processes, for example but not limited to encodes, baseband data received from and sent to radio(s). A radio transmits and/or receives data at one or more frequencies translated above baseband. The virtual baseband unit and radio(s) are components of a communications system such as a cellular communications system.

The messages exchanged between the radios and the NGDU or the DUs and the NGDU follow specific protocol which may include a format, i.e., a syntax with one or more variables. A message sent by the radio in any of user plane, control plane, synchronization plane, or management plane may be using the message protocol which varies based on one or more characteristics of the radio. The I/O data protocol of the radio also varies based upon one or more characteristics of the radio such as for example but not limited to compliance with a specification (for example an input/output data protocol of the radio). Radio characteristics include specification(s) with which the radio complies, radio manufacturer, radio model number, and/or radio software version.

Management Plane (M-Plane) is part of the O-RAN for configuration, monitoring, management and distribution of various services to all layers of O-RAN stack and other parts of the O-RAN. The M-plane messages are used to manage the radio unit. The M-plane provides a variety of O-RU management functions to set parameters on the O-RU side as required by the C/U-Plane and S-Plane, for example but not limited to manage O-RU software, perform fault management, etc. O-RAN fronthaul specification for the M-Plane provides various parameters as data models to FCAPS functions.

O-DU: O-RAN Distributed Unit: a logical node hosting RLC/MAC/High-PHY layers based on a lower layer functional split and O-RU: O-RAN Radio Unit: a logical node hosting Low-PHY layer and RF processing based on a lower layer functional split. This is similar to 3GPP's "TRP" or "RRH" but more specific in including the Low-PHY layer (FFT/iFFT, PRACH extraction).

In an embodiment, the NGDU (1000) includes the RIM management controller (100), multiple DUs (300a-N) connected to the RIM management controller (100), two processing units (400a-b) connected to the RIM management controller (100) and multiple RUs (600a-N) connected to each of the two processing units (400a-b) through multiple CPRI ports. The two processing units (400a-b) can be for example a field programmable gate array (FPGA) comprising multiple CPRI ports. The RIM management controller (100) includes a memory (120), a processor (140), a communicator (160) and a radio management controller (180). The RIM management controller (100) is located within the NGDU (1000) and includes an M-plane model which executed multiple M-plane services.

The radio management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The FIG. 1 indicates the radio management controller (180) out of the processor (140). However, the radio management controller (180) can be incorporated within the processor (140) or as part of any other processor/processors or can in itself be a processor.

In an embodiment, the memory (120) may include DU port registry (184) within the memory (120). The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the radio management controller (180). The processor (140) is configured to execute instructions stored in the memory (120) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the RIM management controller (100) and with external devices via one or more networks.

In an embodiment, the radio management controller (180) includes a CPRI manager (182), the DU port registry (184) and a communication manager (186).

In an embodiment, the CPRI manager (182) is configured to receive a DU port ID associated with the RU of the multiple RUs discovered at the NGDU (1000) and determine a processing unit (400a) of the two processing units (400a-b) to which the RU (600a) is connected. The processing unit (400a) to which the RU (600a) is connected is determined based on the received DU port ID. Further, the CPRI manager (182) is configured to run a search through the DU port registry (184) to map the determined processing unit (400a) to a CPRI port of the multiple CPRI ports. Further, the CPRI manager (182) is configured to determine the the CPRI port connecting the RU (600a) to the NGDU (1000) based on the mapping. The DU port ID associated with the RU (600a) is received in at least one of an extended Antenna-Carrier (eAxC) identifier and a RTC PCID.

In an embodiment, the DU port registry (184) includes a list of DU port IDs supported by each of the two processing units (400a-b) along with corresponding CPRI of the two processing units (400a-b). The data in the DU port registry (184) may be for example provided in a table form and can be used for mapping the determined CPRI port.

In an embodiment, the communication manager (186) is configured to determine an identity of the RU (600a) of the plurality of RUs (600a-N) connected to the determined CPRI port and send the identity of the RU (600a) connected to the determined CPRI port to the corresponding DU (300a). The corresponding DU (300a) is determined based on the mapping performed in the DU port registry (184). Further, the communication manager (186) is configured to enable control plane (C-Plane) data communication between the RU and the corresponding DU (300a).

At least one of the plurality of modules/components of the radio management controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 1 shows various hardware components of the NGDU (1000) but it is to be understood that other embodiments are not limited thereon. In other embodiments, the NGDU (1000) may include less or more number of components. Further, the labels or names of the components are used only for illustrative purpose and does not limit the scope of the invention. One or more components can be combined together to perform same or substantially similar function of the NGDU (1000).

FIG. 2 is a flow diagram (200) illustrating a method for managing radio units in the O-RAN by the NGDU (1000), according to an embodiment as disclosed herein.

Referring to the FIG. 2, at step 202, the method includes the NGDU (1000) receiving the at least one DU port ID associated with the at least one RU (600a) of the plurality of RUs (600a-N) discovered at the NGDU (1000). For example, in the NGDU (1000) described in the FIG. 1, the RIM management controller (100) is configured to receive the at least one DU port ID associated with the at least one RU (600a) of the plurality of RUs (600a-N) discovered at the NGDU (1000).

At step 204, the method includes the determining the processing unit (400a) of the at least two processing units (400a-b) to which the at least one RU (600a) is connected based on the received at least one DU port ID. For example, in the NGDU (1000) described in the FIG. 1, the RIM management controller (100) is configured to determine the processing unit (400a) of the at least two processing units (400a-b) to which the at least one RU (600a) is connected based on the received at least one DU port ID.

At step 206, the method includes the mapping the determined processing unit (400a) to the CPRI port of the plurality of CPRI ports in the DU port registry (184). For example, in the NGDU (1000) described in the FIG. 1, the RIM management controller (100) is configured to map the determined processing unit (400a) to the CPRI port of the plurality of CPRI ports in the DU port registry (184).

At step 208, the method includes the determining the CPRI port connecting the at least one RU (600a) to the NGDU (1000) based on the mapping. For example, in the NGDU (1000) described in the FIG. 1, the RIM management controller (100) is configured to determine the CPRI port connecting the at least one RU (600a) to the NGDU (1000) based on the mapping.

At step 210, the method includes the enabling communication between the at least one RU (600a) connected to the determined CPRI port and the corresponding at least one DU (300a) of the plurality of DUs (300a-N) over the ORAN. For example, in the NGDU (1000) described in the FIG. 1, the RIM management controller (100) is configured to enable communication between the at least one RU (600a) connected to the determined CPRI port and the corresponding at least one DU (300a) of the plurality of DUs (300a-N) over the ORAN.

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the invention.

Figure 3:
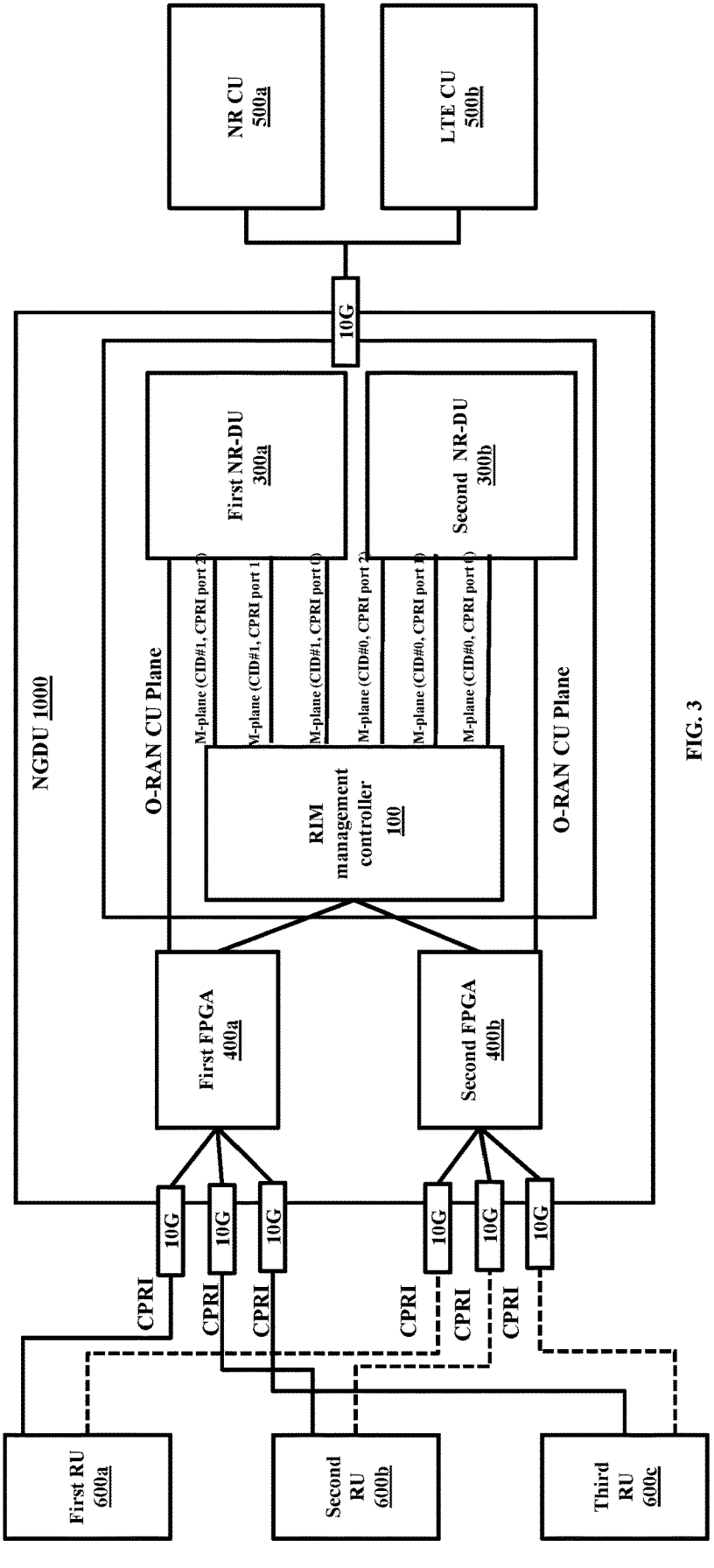
FIG. 3 is an example illustrating as a scenario of managing multiple radios connected to the NGDU, according to an embodiment as disclosed herein.

FIG. 3 is an example illustrating as a scenario of managing the multiple radios connected to the NGDU (1000), according to an embodiment as disclosed herein.

Referring to the FIG. 3, the proposed method uses a top-down approach of discovering the radios (600a-N) which is connected to the NGDU (1000).

Conventionally, the legacy systems supported single radios with multiple carriers. Unlike to the conventional methods and systems, the proposed method includes the NGDU (1000) supporting multiple radios (600a-N) which are connected to different CPRI ports.

From the RU (600a) perspective, there are two different carriers. But since the RUs (600a-N) are connected to two different CPRI ports, there exists two physical connections. These RUs (600a-N) are in communication with multiple DUs (300a-b) or a single DU (300a).

Consider that the NGDU (1000) includes two processing units or FPGAs i.e., first FPGA (400a) and a second FPGA (400b) with each FPGA comprising multiple CPRI ports (three CPRI ports each). Each FPGA is connected to three RUs i.e., first RU (600a), second RU (600b) and third RU (600c).

Each of the RUs (600a/b/c) support two carriers i.e., a first carrier associated with the 5G and a second carrier associated with the LTE. Further, the first FPGA (400a) connects each of the RU (600a/b/c) to the first NR-DU (300a) and then to the NR CU (500a). The second FPGA (400b) connects each of the RU to the second NR-DU (300b) and thereby to the LTE CU (500b).

The RIM management controller (100) comprises RIM application which connects multiple M-plane services for each of the RU (600a/b/c) with the corresponding DUs. The connecting of the multiple M-plane services is performed based on a configuration received at the RIM management controller (100). The configuration includes information such as for example, but not limited to single DU configuration or multiple DU configuration, to which of the ports the M-plane services needs to be assigned to initiate the Call Home procedure, definition of the first NR-DU (300a) and the second NR-DU (300b) as tenant and host, etc.

The proposed method enables the discovery of the CPRI port to which the RU (600a/b/c) is connected. In order to discover the CPRI port to which the RU (600a/b/c) is connected, the information required includes a carrier ID bit indicating whether the RU is connected to the first FPGA (400a) or the second FPGA (400b). This information is obtained from Northbound. The Northbound will push this information to the DU in the eAxC ID. The information is determined form the field based on the carrier ID of the eAxC ID. If the carrier ID is 0, then the RU (600a/b/c) is connected to the first FPGA (400a) and if the carrier ID is 1, then the RU (600a/b/c) is connected to the second FPGA (400b). The carrier ID or the DU port ID is obtained as soon as the RU (600a/b/c) is connected to the NGDU (1000).

Further, the next information required to identify the RU (600a/b/c) to communicate with the DU (300a-b) is to know which CPRI port of the first FPGA (400a)/the second FPGA (400b), the RU (600a/b/c) is connected. To determine the CPRI port of the first FPGA (400a)/the second FPGA (400b) to which the RU (600a/b/c) is connected, the DU port registry (184). The DU port registry (184) is sorted to determine the mapping for the obtained DU port ID/carrier ID to know the specific CPRI port to which RU (600a/b/c) is connected.

The eAxC ID identifies the specific data flow associated with each C-Plane (ecpriRtcid) or U-Plane (epriPcid) message. It is the analog of CPRI's "A×C" (antenna-carrier) value so is designated here as "eAxC" ("e" for "extended" to accommodate multiple bands and multiple component carriers). Multiple O-DU processors may contribute to a single eAxC.

The eAxC ID value assigned to an O-RU's endpoint is used to identify the endpoint within O-RU and shall be unique among all endpoints of O-RU of the same direction (Tx or Rx). An O-RU's endpoint could in principle be associated with multiple physical and virtual fronthaul interfaces (Ethernet ports and VLANs), but an eAxC ID value shall be unique and cannot be used to address different endpoints. The O-DU may decide to use same eAxC ID value to address endpoints on different O-RUs, but eAxC ID values assigned to one O-RU shall be unique within the O-RU's endpoints of same direction Therefore, the proposed method enables the user to identify the multiple radios connected to the CPRI ports at the DUs and enable communication between the same. Here, the proposed method specifically caters to the existing architecture without the use of enhanced CPRI (eCPRI).

FIG. 4 is an example illustrating RTC PCID comprising DU port ID for identifying the FPGA (400a/400b), according to an embodiment as disclosed herein.

Referring to the FIG. 4, the current RTC PCID is provided. In general, the excid is tightly coupled with FPGA number as well as the CPRI port. On discovery of the RU (600a/b/c), the respective excid (DU port id) has to configured from the DU (300a/300b) through the M-plane.

Through M-plane, there is no yang leaf to specify the CPRI port which got discovered. If the DU port id does not match with the discovered CPRI port, then the packets will be dropped leading to loss of data.

Conventionally, there is no existing list node present in the o-ran-hardware.yang, which is able to provide the information (list of discovered CPRI ports). Therefore, the proposed method includes adding the new list entry to the o-ran-hardware or which can be used by DU during fetching of hardware inventory details. Therefore, the proposed method introduces the DU port registry (184) which will comprise the list of the DU port IDs and the corresponding CPRI ports. In the FIG. 4, Bit 14-15 denotes CPRI port and Bit 11—denotes FPGA number. Table. 1 provides an example table from the DU port registry (184).

TABLE 1

| FPGA | CPRI | AXC | EXCID(DEC) | EXCID(HEX) |
|---|---|---|---|---|
| 0 | 0 | 0 | 0 | 0x000 |
| | | 1 | 1 | 0x001 |
| | | 2 | 2 | 0x002 |
| | | 3 | 3 | 0x003 |
| 0 | 1 | 0 | 16384 | 0x4000 |
| | | 1 | 16385 | 0x4001 |
| | | 2 | 16386 | 0x4002 |
| | | 3 | 16387 | 0x4003 |
| 0 | 2 | 0 | 32768 | 0x8000 |
| | | 1 | 32769 | 0x8001 |
| | | 2 | 32770 | 0x8002 |
| | | 3 | 32771 | 0x8003 |
| 1 | 0 | 0 | 2048 | 0x800 |
| | | 1 | 2049 | 0x801 |
| | | 2 | 2050 | 0x802 |
| | | 3 | 2051 | 0x803 |
| 1 | 1 | 0 | 18432 | 0x4800 |
| | | 1 | 18433 | 0x4801 |
| | | 2 | 18434 | 0x4802 |

TABLE 1-continued

| FPGA | CPRI | AXC | EXCID(DEC) | EXCID(HEX) |
|---|---|---|---|---|
| | | 3 | 18435 | 0x4803 |
| 1 | 2 | 0 | 34816 | 0x8800 |
| | | 1 | 34817 | 0x8801 |
| | | 2 | 34818 | 0x8802 |
| | | 3 | 34819 | 0x8803 |

The yang for the proposed method is provided.
Current nodes of o-ran-hardware.yang:
module: o-ran-hardware
  augment/hw:hardware/hw:component:
    +--ro label-content
    |+--ro model-name?
    |+--ro serial-number?
    +--ro product-code
    +--rw energy-saving-enabled?
  augment/hw:hardware/hw:component:
    +--rw o-ran-name
  augment/hw:hardware/hw:component/hw:state:
  +--ro power-state?
    +--ro availability-state?
  augment/hw:hardware-state-oper-enabled:
    +--ro availability-state?
  augment/hw:hardware-state-oper-disabled:
  +--ro availability-state?

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A Next Generation Distributed Unit (NGDU) for managing radio units in an Open Radio Access Network (O-RAN), wherein the NGDU comprises:
  a radio interface module (RIM) management controller comprising a Management Plane (M-plane) model;
  a plurality of Distributed Units (DUs) connected to the RIM management controller;
  at least two processing units connected to the RIM management controller, wherein each of the at least two processing units comprises a plurality of Common Public Radio Interface (CPRI) ports;
  a plurality of Radio Units (RUs) connected to each of the at least two processing units through the plurality of CPRI ports; and
  wherein the RIM management controller comprises:
  a memory,
  a processor coupled to the memory, and wherein the processor is configured to:
  receive at least one DU port ID associated with the at least one RU of the plurality of RUs discovered at the NGDU,
  determine a processing unit of the at least two processing units to which the at least one RU is connected based on the received at least one DU port ID, map the determined processing unit to a CPRI port of the plurality of CPRI ports in a DU port registry,
  determine the CPRI port connecting the at least one RU to the NGDU based on the mapping, and
  enable communication between the at least one RU connected to the determined CPRI port and a corresponding at least one DU of the plurality of DUs over the O-RAN.

2. The NGDU as claimed in claim 1, wherein the DU port registry comprises a list of DU port ID supported by each of the at least two processing units with corresponding CPRI of the at least two processing units.

3. The NGDU as claimed in claim 1, wherein the at least one DU port ID associated with the at least one RU is received in at least one of an extended Antenna-Carrier (eAxC) identifier and a RTC PCID.

4. The NGDU as claimed in claim 1, wherein the processor is configured to enable the communication between the at least one RU and the corresponding at least one DU of the plurality of DUs based on the determined the CPRI port comprises:
  determine an identity of the at least one RU of the plurality of RUs connected to the determined CPRI port;
  send the identity of the at least one RU connected to the determined CPRI port to the corresponding at least one DU, wherein the corresponding at least one DU is determined based on the mapping performed in the DU port registry; and
  enable control plane (C-Plane) data communication between the at least one RU and the at least one corresponding DU.

5. The NGDU as claimed in claim 1, wherein the processing unit is a field programmable gate array (FPGA) comprising the plurality of CPRI ports.

6. A method for managing radio units in an Open Radio Access Network (O-RAN) by a Next Generation Distributed Unit (NGDU), wherein the method comprises:
  receiving, by the NGDU, at least one Distributed Unit (DU) port ID associated with at least one Radio Unit (RU) of a plurality of RUs discovered at the NGDU, wherein the plurality of RUs is connected to at least two processing units through a plurality of Common Public Radio Interface (CPRI) ports;
  determining, by the NGDU, a processing unit of the at least two processing units to which the at least one RU is connected based on the received at least one DU port ID;
  mapping, by the NGDU, the determined processing unit to a CPRI port of the plurality of CPRI ports in a DU port registry;
  determining, by the NGDU, the CPRI port connecting the at least one RU to the NGDU based on the mapping; and
  enabling, by the NGDU, communication between the at least one RU connected to the determined CPRI port and a corresponding at least one DU of the plurality of DUs over the O-RAN.

7. The method as claimed in claim 6, wherein the DU port registry comprises a list of DU port ID supported by each of the at least two processing units with corresponding CPRI of the at least two processing units.

8. The method as claimed in claim 6, wherein the at least one DU port ID associated with the at least one RU is received in at least one of an extended Antenna-Carrier (eAxC) identifier and a RTC PCID.

9. The method as claimed in claim 6, wherein enabling, by the NGDU, communication between the at least one RU connected to the determined CPRI port and the corresponding at least one DU of the plurality of DUs over the O-RAN comprises:

determining, by the NGDU, an identity of the at least one RU of the plurality of RUs connected to the determined CPRI port;

sending, by the NGDU, the identity of the at least one RU connected to the determined CPRI port to the corresponding at least one DU, wherein the corresponding at least one DU is determined based on the mapping performed in the DU port registry; and enabling, by the NGDU, control plane (C-Plane) data communication between the at least one RU and the at least one corresponding DU.

10. The method as claimed in claim 6, wherein the processing unit is a field programmable gate array (FPGA) comprising the plurality of CPRI ports.

* * * * *